US008806203B2

(12) United States Patent
Frank (10) Patent No.: US 8,806,203 B2
(45) Date of Patent: Aug. 12, 2014

(54) SERVER-SIDE SECURITY FOR UNTRUSTED CLIENTS USING DIRECTORY HIDING (75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 12/825,762

(22) Filed: Jun. 29, 2010

(65) Prior Publication Data

US 2012/0216299 A1   Aug. 23, 2012

(51) Int. Cl.
*H04L 29/06*   (2006.01)
*G06F 21/62*   (2013.01)

(52) U.S. Cl.
CPC .................................. *G06F 21/6227* (2013.01)
USPC ........... 713/168; 713/169; 713/170; 713/171; 713/172; 726/27; 726/28; 726/29; 726/30

(58) Field of Classification Search
CPC .................................................. G06F 21/6227
USPC .......................................................... 713/168
See application file for complete search history.

(56) References Cited

U.S. PATENT DOCUMENTS

2004/0059866 A1\* 3/2004 Patel et al. ..................... 711/100
2005/0228835 A1\* 10/2005 Roa ............................... 707/204

\* cited by examiner

*Primary Examiner* — Longbit Chai
(74) *Attorney, Agent, or Firm* — Lowenstein Sandler LLP (57) ABSTRACT A security mechanism provided by a server protects files in data storage from untrusted clients. In one embodiment, the server generates a filename in response to a request from a client for creating a filename. The filename is associated with a file to be stored in the data storage managed by the server. The server manages a directory that contains the filename, and hides the directory contents from the client. The client is granted access to the file when the client provides the filename associated with the file.

16 Claims, 5 Drawing Sheets

SERVER-SIDE SECURITY FOR UNTRUSTED CLIENTS USING DIRECTORY HIDING

TECHNICAL FIELD

Embodiments of the present invention relate to a storage system, and more specifically, to a client-server environment that provides data security in data storage.

BACKGROUND

In a client-server environment, a server provides computing and/or storage resources to a client through a network. The client may run an application using the server's central processing unit (CPU), or may store client files in a storage device managed by the server.

Some of the clients, referred to as untrusted clients, are not trusted by the server. To prevent untrusted clients from unauthorized file access, a server may allow file access by a client only if the client possesses valid credentials to be authenticated. Conventional file systems, such as Network File System (NFS), use data encryption standard (DES) encryption and public key cryptography to authenticate a client. Further, a permission mode can be set for each file and directory in the file system to restrict client's access to those files that are necessary for client's operations. With conventional file systems, an authenticated client is allowed to read, write and/or execute one or more files in a directory. Typically, the client can view a list of files in the directory, and choose one or more of the files in the directory to access. However, conventional file systems still suffer from security loopholes and enhancement techniques can be complex.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing a server-side security mechanism to protect files in data storage from untrusted clients. In one embodiment, the server generates a filename in response to a request from a client for creating a filename. The filename is associated with a file to be stored in the data storage managed by the server. The server manages a directory that contains the filename, and hides the directory contents from the client. The client is granted access to the file when the client provides the filename associated with the file.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "hiding", "grating", "storing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
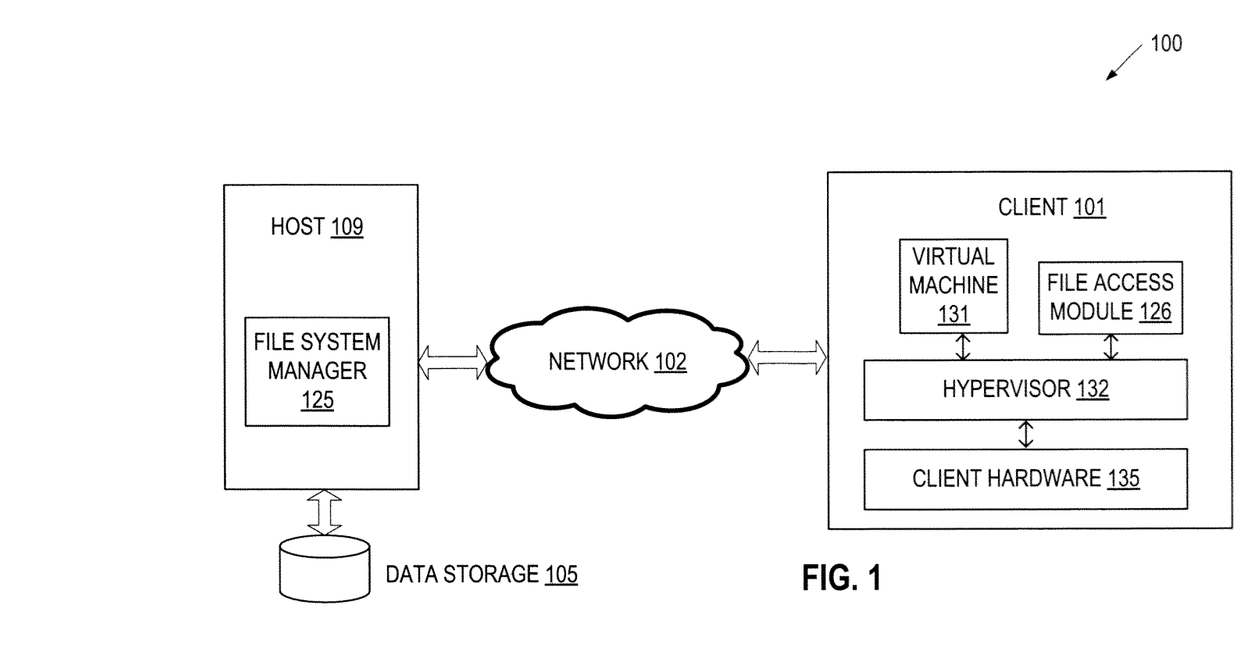
FIG. 1 illustrates an exemplary network architecture in which embodiments of the present invention may operate.

FIG. 1 illustrates an exemplary network architecture 100 in which embodiments of the present invention may operate. The network architecture 100 includes a server 109 coupled to a client 101 over a network 102. The network 102 may be a private network (e.g., a local area network (LAN), a wide area network (WAN), intranet, etc.) or a public network (e.g., the Internet). The server 109 is also coupled to data storage 105. The data storage 105 includes one or more mass storage devices (e.g., disks), which may be located at a centralized location or distributed across multiple geographic locations. Although only one server 109 and one client 101 are shown, it is understood that the network architecture 100 may include any number of servers and clients.

In one embodiment, the server 109 provides the Network File System (NFS) to the client 101. The client 101 can access data in the data storage 105 via the server 109 using the NFS protocol. In alternative embodiments, a different file system and/or a different file system protocol may be used. The data storage 105 can be used to store files that belong to the client and are not currently used by the client 101. For example, a backup copy of the client files may be stored in the data storage 105. The files that are currently in use can be stored locally on the client 101.

In one embodiment, the client 101 may be a power client. In a client-based computing (CBC) environment, a power client is a client that can run at least one virtual machine. The virtual machine 131 may run a guest operating system that is different from the underlying client operating system. The guest operating system may include Microsoft Windows, Linux, Solaris, Mac OS, etc. If a power client runs multiple virtual machines 131, the guest operating system on each virtual machine may be the same or different. The power client may include a hypervisor 132 that emulates the underlying client hardware 135, making the use of the virtual machine 131 transparent to the guest operating system and the user of the client 101. The hypervisor 132 may also be known as a virtual machine monitor (VMM) or a kernel-based hypervisor. In some embodiments, the hypervisor 132 is part of a client operating system.

Some files of the virtual machine 131 may not be in current use, and can be stored in the data storage 105 though the server 109. Power clients are not trusted clients. Therefore, power clients are prevented from directly accessing the files in the data storage 105.

Alternatively, the client 101 may be a client device that is not a power client. The client 101 may store files in the data storage 105, and access these files via the server 109 when necessary. In an embodiment where the network architecture 100 includes multiple clients, some of the clients can be power clients and some of the other clients can be non-power clients. To protect data integrity in the data storage 105, the server 109 may treat all of these clients as untrusted clients. It is understood that the operations to be described below (with reference to FIGS. 2-4) can be applied to any untrusted client that stores and accesses its files in the data storage 105 though the server 109.

According to one embodiment of the present invention, the server 109 includes a file system manager 125 to manage the files stored in the data storage 105 by the client 101. The client 101 includes a file access module 126 to perform operations for accessing the stored files in the data storage 105. The client 101 may store a file under a directory in the data storage 105. However, the client 101 cannot view the contents of the directory. The contents of the directory are hidden from the client 101 by the file system manager 125. On a conventional Unix-based or Linux-based system, a user of a client can type in an "ls" command, which stands for "list", to see a list of filenames under a directory. The user can then type in the filename to access the file. This list permission is removed by the file system manager 125 from the root directory, such that the client 101 will not be able to see the contents of any directory below the root directory. Instead, the file system manager 125 enables a "walk" option for the client 101, which allows a filename provided by the client 101 to be compared with the filenames in the directory tree. Thus, the client 101 needs to know the exact filename of a file to access the file. The filename includes the entire pathname from the root to a specific location in the directory tree where the file is stored (e.g., ./dir1/dir2/myfile). This filename is assigned by the file system manager 125 upon request. When the client 101 submits the filename to the file system manager 125 for file access, the file system manager 125 uses the enabled "walk" option to walk down the directory tree to search for a matching filename. Operations of the file system manager 125 will be described in greater detail with reference to FIGS. 2-4.

Figure 2:
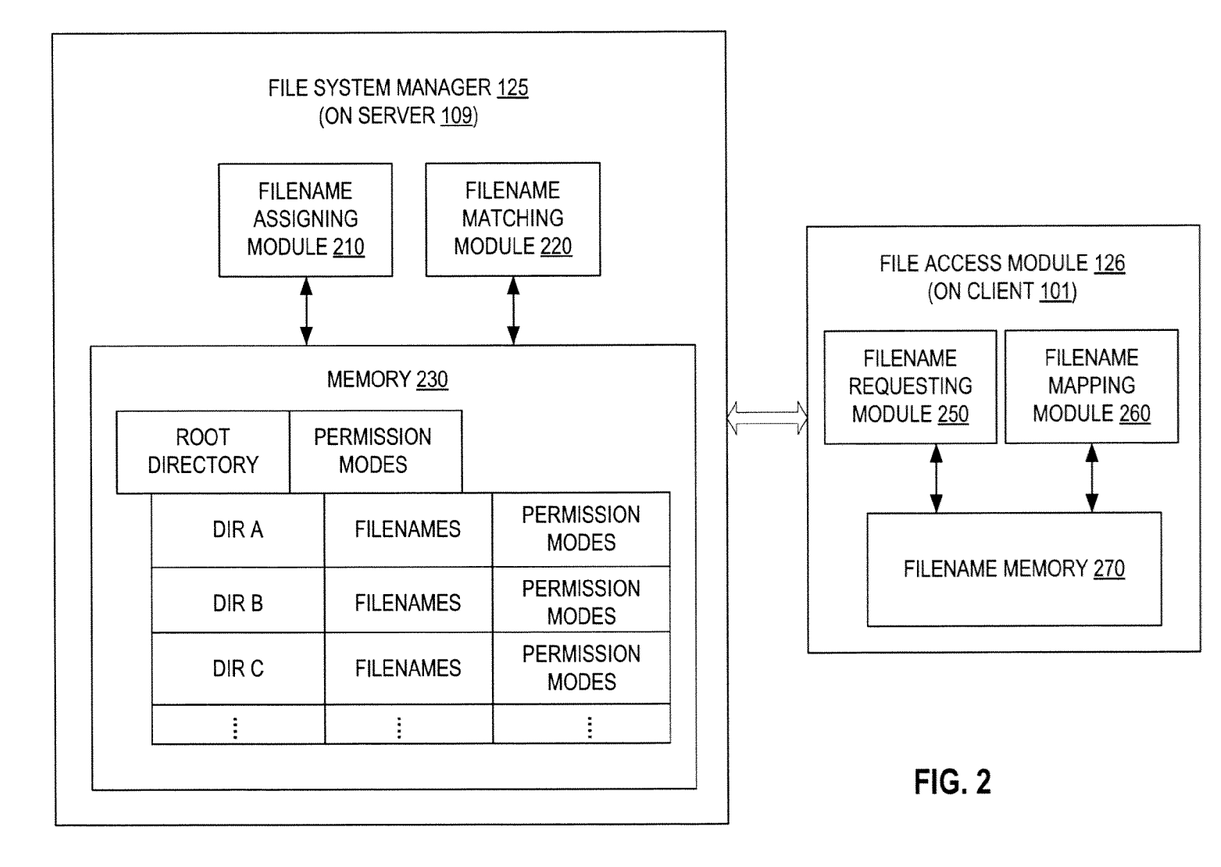
FIG. 2 illustrates an embodiment of a file system manager on a server that provides file access to a file access module on a client.

FIG. 2 is a block diagram that illustrates an embodiment of the file system manager 125 and the file access module 126 of FIG. 1. The file system manager 125 includes a filename assigning module 210 to assign a filename to a client 101 upon receiving a request from the client 101. The client 101 may request that a filename be assigned to a file prior to, or at the same time as, requesting the file be stored in the data storage 105. In response to the request, the filename assigning module 210 generates a complex name as the filename. At least a portion of the filename can be generated randomly. For example, the filename (e.g., ./dir1/dir2/myfile) includes the name of the path leading from the root to the directory in which the file will be stored (e.g., ./dir1/dir2), and the name in the directory (myfile). Each of the names "dir1", "dir2", and "myfile" can be a long string of random alphanumeric values assigned by the filename assigning module 210. The file system manager 125 stores the filename in a local memory 230 and sends the filename to the client 101. The filenames stored in the memory 230 may be organized as a directory tree that includes the names of all of the files stored in the data storage 105.

In one embodiment, the file system manager 125 also includes a filename matching module 220 to determine whether a filename received from a requesting client matches one of the filenames stored in the memory 230. The filename matching module 220 compares the received filename with the names of directories and files at each level of the directory tree. If the received filename matches a stored filename, the file system manager 125 determines whether the requesting client has permission to perform the requested operation (e.g., read, write, or execute). In one embodiment, the file system manager 125 stores a permission mode associated with each file and each directory in the memory 230. The permission mode indicates whether the client 101 can read, write, or execute a file. The file system manager 125 grants file access to the requesting client if a matching stored filename is found and the requested operation is allowed according to the permission mode.

In one embodiment, the file access module 126 on the client 101 includes a filename requesting module 250, which sends a request to the file system manager 125 for assigning a filename to a file when the file is to be stored in the data storage 105. The file access module 126 stores the filename assigned by the storage manager 125 in a filename memory 270. In one embodiment, the file access module 126 also include a filename mapping module 260 that maps the filename used by a user of the client 101 to the filename assigned by the server 109. The filename used by the user can be shorter and more meaningful to the user than the filename assigned by the server 109.

Figure 3:
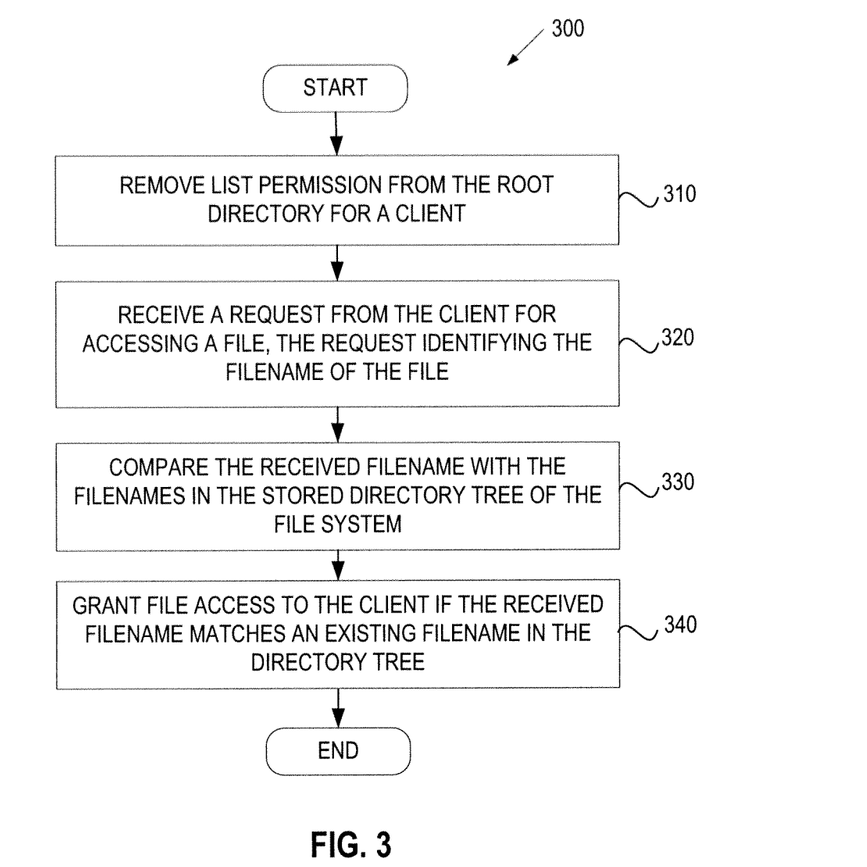
FIG. 3 is a flow diagram illustrating a method of the file system manager of FIG. 2 for providing file access to a client in accordance with one embodiment of the present invention.

FIG. 3 is a flow diagram illustrating one embodiment of a method 300 for granting file access to a client. The method 300 may be performed by processing logic 526 of FIG. 5 that may comprise hardware (e.g., circuitry, dedicated logic, programmable logic, microcode, etc.), software (e.g., such as instructions on a computer readable storage medium executable by a processing system), or a combination thereof. In one embodiment, the method 300 is performed by the file system manager 125 on the server 109 (FIGS. 1 and 2).

Referring to FIG. 3, in one embodiment, the method 300 begins with the file system manager 125 removing the list permission from the root directory for the client 101 (block 310). Without the list permission, the client 101 is unable to view the names of the files stored in the data storage 105. To request access to a file, the client 101 needs to include the exact filename of the file in a file access request. When the file system manager 125 receives the file access request from the client 101 (block 320), the file system manager 125 determines, based on information in the request, whether the client 101 is allowed to access the file. The determination can be based on the filename received from the client. The file system manager 125 compares the received filename with the filenames in the stored directory tree of the file system (block 330). The comparison starts from the root level of the directory tree and continues, level by level, down to the lowest level where the requested file is located. The file system manager 125 grants file access to the client 101 if the received filename matches an existing filename in the directory tree (block 340). In some embodiment, the file system manager 125 may also determine whether the client 101 has permission to perform the requested operation (read, write and/or execute) based on the permission mode associated with the file.

Figure 4:
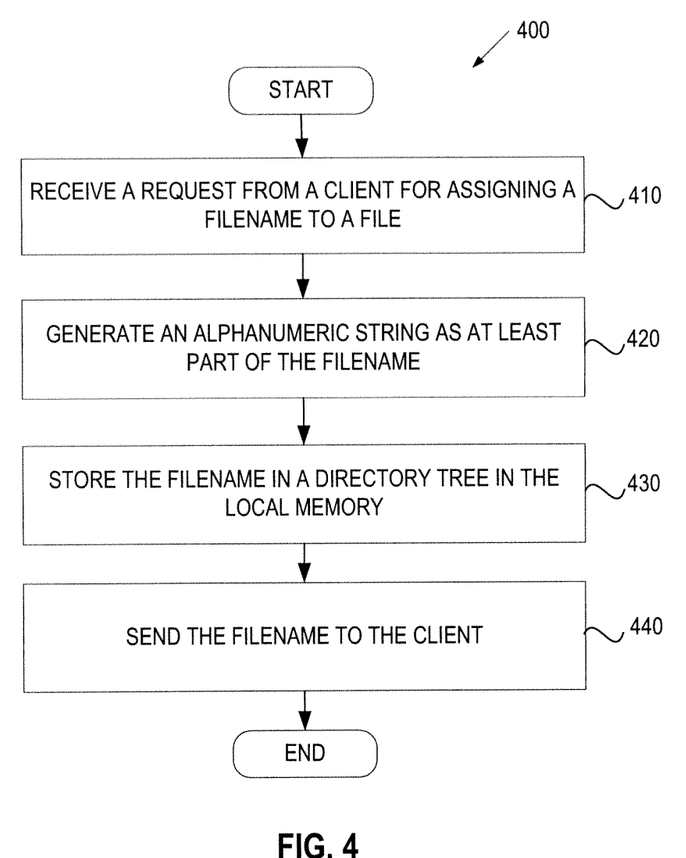
FIG. 4 is a flow diagram illustrating a method of the file system manager of FIG. 2 for creating a filename in accordance with one embodiment of the present invention.

FIG. 4 is a flow diagram illustrating one embodiment of a method 400 for creating a filename. The method 400 may be performed by processing logic 526 of FIG. 5 that may comprise hardware (e.g., circuitry, dedicated logic, programmable logic, microcode, etc.), software (e.g., such as instructions on a computer readable storage medium executable by a processing system), or a combination thereof. In one embodiment, the method 400 is performed by the file system manager 125 on the server 109 (FIGS. 1 and 2).

Referring to FIG. 4, in one embodiment, the method 400 begins with the file system manager 125 receiving a request from the client 101 for assigning a filename to a file (block 410). The file system manager 125 generates an alphanumeric string as at least part of the filename (block 420). In one embodiment, the alphanumeric string may be appended to a pathname that specifies a directory, under which the file is to be located. The file system manager 125 then stores the filename in the directory tree of the file system in the local memory (block 430). The file system manager 125 then sends the filename to the client 101 (block 440).

Figure 5:
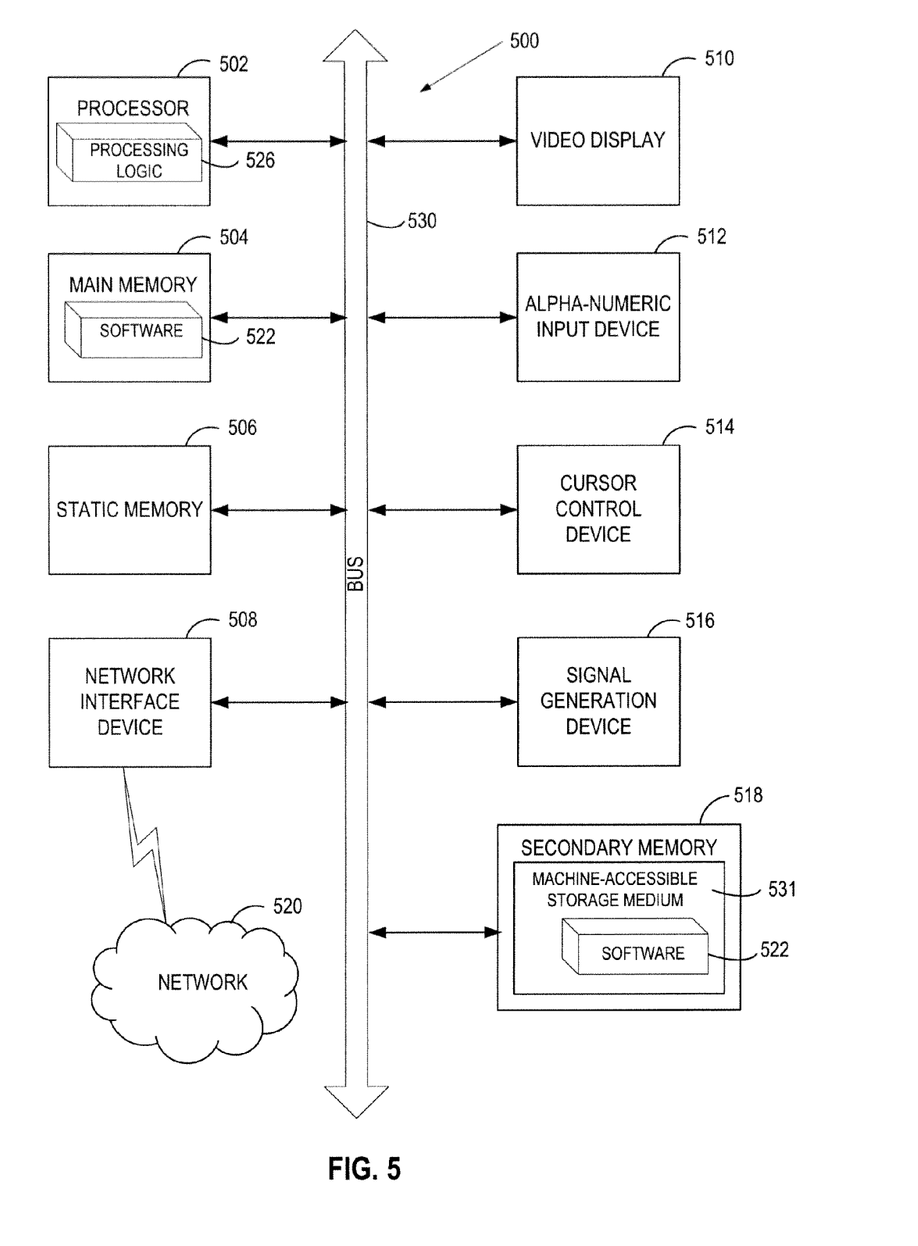
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the file system manager 125 and the file access module 126 of FIGS. 1 and 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   generating, by a server computer in response to a request from a client of a plurality of clients, a filename for a file to be stored in data storage managed by the server computer;
   storing the filename in a directory containing filenames of a plurality of files stored in the data storage, the directory being accessible to the plurality of clients;
   upon receiving, by the server computer, a first request of the client for a list of the filenames contained in the directory from refraining from providing the list of the file names contained in the directory to the client, wherein refraining from providing the list of the file names comprises removing a list permission from a root directory to prevent the client from viewing the file names of the plurality of files stored in the data storage; and
   upon receiving a second request of the client for the file, granting to the client, by the server computer, access to the file when a filename included in the second request matches the filename generated by the server computer for the file and stored in the directory.

2. The method of claim 1, wherein the file is a virtual machine file used by a virtual machine that runs on the client.

3. The method of claim 1, wherein generating a filename further comprises:
   generating an alphanumeric string as at least a portion of the filename.

4. The method of claim 1, wherein the filename includes a pathname from a root directory in a directory tree.

5. The method of claim 1, wherein generating a filename further comprises:
   storing the filename in a directory tree in local memory; and
   sending the filename to the client.

6. A non-transitory computer readable storage medium including instructions that, when executed by a server computer, cause the server computer to perform a method comprising:
   generating, in response to a request from a client of a plurality of clients, a filename for a file to be stored in data storage managed by the server computer;
   storing the filename in a directory containing filenames of a plurality of files stored in the data storage, the directory being accessible to the plurality of clients;
   upon receiving, by the server computer, a first request of the client for a list of the filenames contained in the directory from refraining from providing the list of the file names contained in the directory to the client, wherein refraining from providing the list of the file names comprises removing a list permission from a root directory to prevent the client from viewing the file names of the plurality of files stored in the data storage; and
   upon receiving a second request of the client for the file, granting to the client, by the server computer, access to the file when a filename included in the second request matches the filename generated by the server computer for the file and stored in the directory.

7. The computer readable storage medium of claim 6, wherein the file is a virtual machine file used by a virtual machine that runs on the client.

8. The computer readable storage medium of claim 6, wherein generating a filename further comprises:
   generating an alphanumeric string as at least a portion of the filename.

9. The computer readable storage medium of claim 6, wherein the filename includes a pathname from a root directory in a directory tree.

10. The computer readable storage medium of claim 6, wherein generating a filename further comprises:
    storing the filename in a directory tree in local memory; and
    sending the filename to the client.

11. A system comprising:
    a server computer coupled to the data storage to manage the files, the server computer to generate, in response to a request from a client of a plurality of clients, a filename for a file to be stored in the data storage, to store the filename in a directory containing filenames of the files stored in the data storage, the directory being accessible to the plurality of clients, to refrain from providing a list of the file names contained in the directory to the client upon receiving a first request of the client for the list of the filenames contained in the directory, wherein refraining from providing the list of the file names comprises removing a list permission from a root directory to prevent the client from viewing the file names of the plurality of files stored in the data storage and to grant, upon receiving a second request of the client for the file, access to the file to the client when a filename included in the second request matches the filename generated by the server computer for the file and stored in the directory.

12. The system of claim 11, wherein the server computer further comprises:
    a filename assigning module to generate an alphanumeric string as at least a portion of the filename.

13. The system of claim 11, wherein the filename includes a pathname from a root directory in a directory tree.

14. The system of claim 11, wherein the server computer further comprises:
    a filename matching module to determine whether a received filename from the client matches an existing filename in the directory hidden from the client.

15. The system of claim 11, further comprising:
memory to store the filename in a directory tree.

16. The system of claim 11, wherein the server computer provides a Network File System (NFS) to the client.

* * * * *